Figure 1:
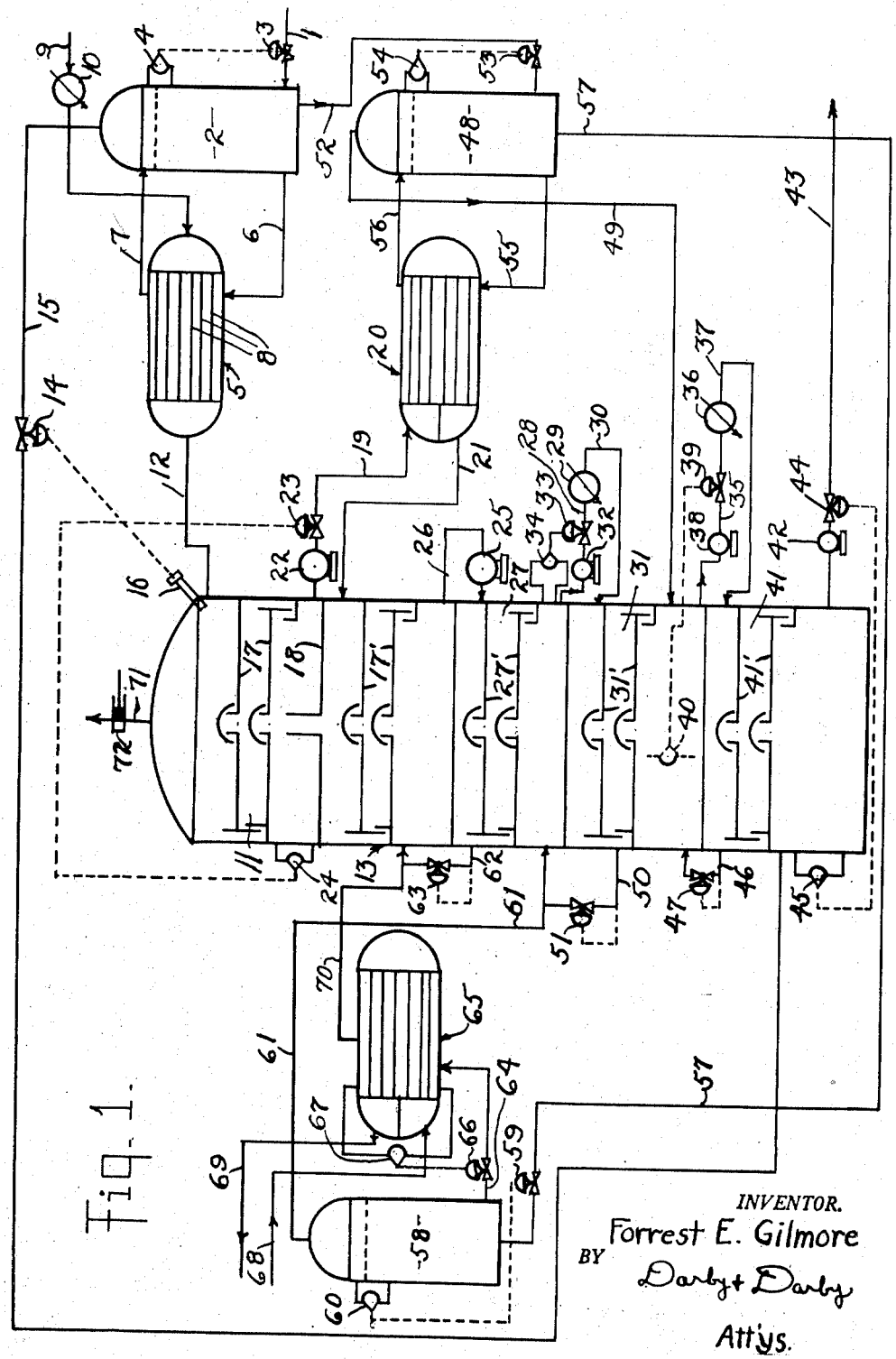

Sept. 1, 1953 F. E. GILMORE 2,650,480
LOW-TEMPERATURE ABSORPTION REFRIGERATION
Filed Aug. 22, 1947 2 Sheets-Sheet 1

INVENTOR.
Forrest E. Gilmore
BY Darby & Darby
Att'ys.

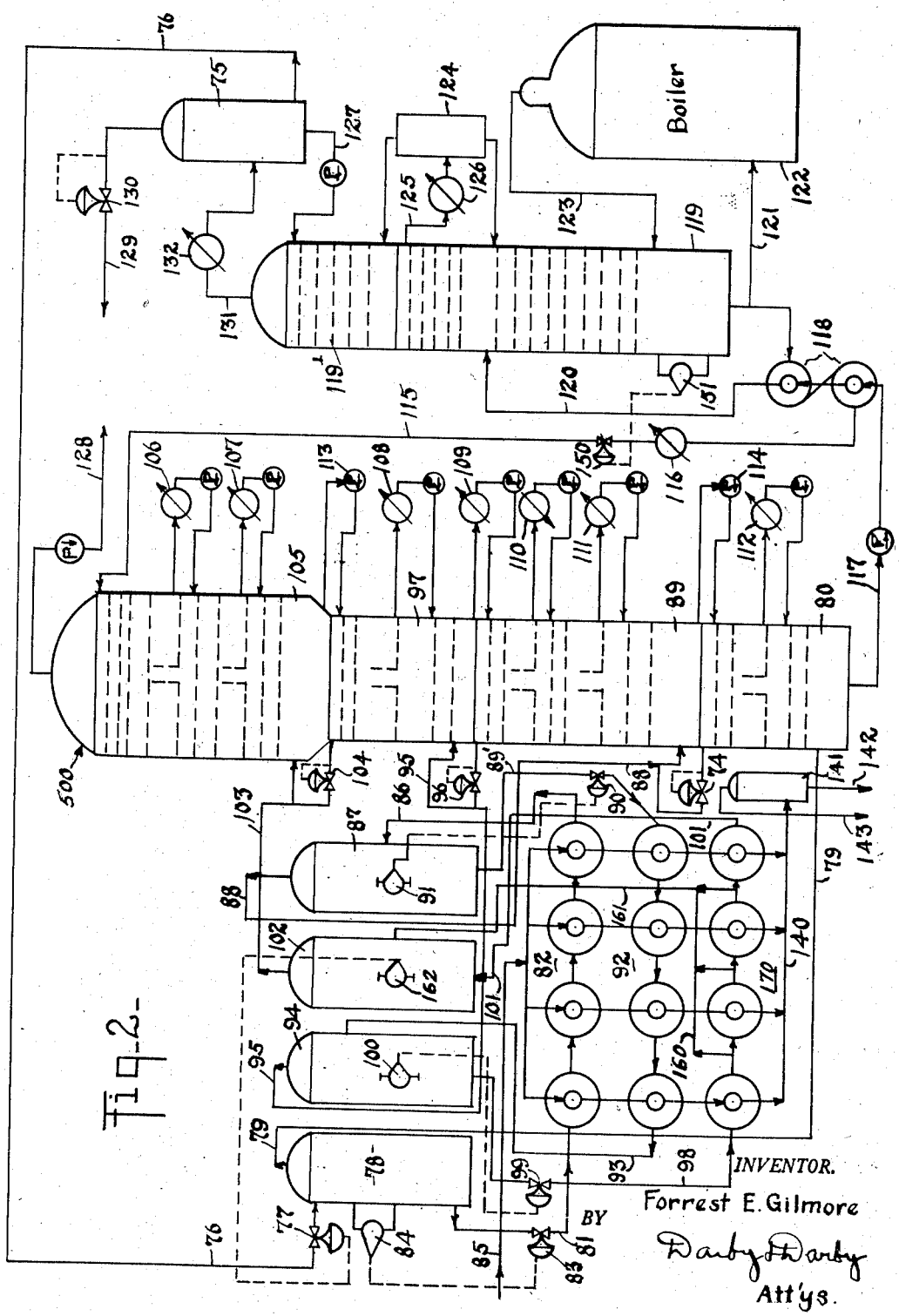

Patented Sept. 1, 1953

2,650,480

UNITED STATES PATENT OFFICE 2,650,480

LOW-TEMPERATURE ABSORPTION REFRIGERATION

Forrest E. Gilmore, Bartlesville, Okla., assignor to Phillips Petroleum Company, a corporation of Delaware Application August 22, 1947, Serial No. 770,055

7 Claims. (Cl. 62—5)

This invention relates to apparatus and methods by means of which efficient low temperature refrigeration is accomplished economically by means of multi-stage expansion and absorption using anhydrous ammonia as a refrigerant and aqua ammonia as the absorbent.

The general object of this invention is to provide a novel economical method and apparatus to effect efficient low temperature refrigeration employing an ammonia absorption system in a plurality of expansion and absorption stages.

Another object of this invention is to provide a refrigeration system and method of this type using a relatively small amount of power driven machinery, resulting in low operating and repair costs and eliminating mechanical hazards of other refrigeration systems such as the propane compression type of refrigeration system.

Another object of this invention is the use of an ammonia absorption refrigeration system wherein cooling is effected in stages in which the ammonia is successively evaporated at progressively lower pressures and the ammonia vapor generated is absorbed in the same aqua ammonia moving through the successive stages in the order of increasing pressures.

Other and more detailed objects of the invention will be apparent from the following disclosure of the several embodiments thereof illustrated in the attached drawings.

This invention resides substantially in the combination, construction, arrangement, relative location of parts, steps and series of steps, all as will be described in detail below.

In the accompanying drawings—

Figure 1 is a schematic and diagrammatic illustration of one form of apparatus embodying the principles of this invention; and Figure 2 is a similar illustration of the application of the principles of this invention to the extraction of natural gasoline from natural gas.

In the system of Figure 1 the supply of liquid refrigerant, preferably anhydrous ammonia, flows from the condenser of a still, not shown, through the line 1 into the flash tank 2, the liquid level of which is determined by the fluid pressure operated valve 3 actuated as indicated by the liquid level controller 4. The system disclosed employs quite a few of these fluid pressure actuated valves and liquid level controllers. The valves are, as illustrated, of the diagram type available commercially in many forms and the liquid level controllers are likewise commercially known in several forms suitable for the purpose. The valves 3 are actuated by and in accordance with changes in the liquid level which actuates the liquid level controller to in turn control the exhaust of pressure fluid to the motor valves to cause them to operate in the proper direction to maintain a predetermined liquid level.

The flash tank 2 is connected to the primary absorption cooler 5 by means of the liquid line 6 and the vapor line 7 which returns to the flash tank 2 above the maintained liquid level therein. The cooler 5 is a tube type of heat exchanger in which the tubes 8 are immersed in the liquid anhydrous ammonia and the material to be cooled flows through the tubes. Heat exchangers of this type are well known devices in this art.

The liquid absorbent in this case, preferably very weak aqua ammonia, is supplied from a still, not shown, through the line 9 to the heat exchanger 5 so as to be delivered to the tubes thereof. In the line 9 is a water cooler 10 for cooling the aqua ammonia. After passing through the tubes of the heat exchanger 5 the aqua ammonia is delivered by means of the line 12 into the uppermost section 11 of the absorber generally indicated by the reference numeral 13. The aqua ammonia is discharged into the absorber through the line 12 at a desired temperature which temperature is controlled by the motor valve 14 and the thermostat 16. The valve 14 is in the line 15 coming from the top of the flask tank and controls the pressure on the liquid ammonia in the heat exchanger 5 and thus its temperature.

In section 11 of the absorber 13 the cold absorbent, aqua ammonia, passes downwardly over a plurality of bubble trays 17, or other form of baffling and is warmed as it absorbs refrigerant vapors and collects on the take-off tray 18. It is delivered from the take-off tray 18 through a line 19 to and through the secondary absorbent cooler or heat exchanger 20 which is like the heat exchanger 5. In the cooler 20, if extremely low temperatures are desired, the absorbent is cooled by evaporation of liquid refrigerant to a lower temperature than it was cooled in the primary cooler 5. From the secondary cooler 20 the secondary absorbent passes through line 21 back into the section 11 of the absorber below the tray 18. Pipe 19 has a pump 22 and a motor valve 23 controlled by the liquid level device 24, as indicated. This arrangement throttles the flow of partially saturated absorbent from the take-off tray 18 so as to maintain a constant liquid level of the absorbent on the take-off tray 18.

The cold absorbent descends through the bubble tray 17' in the lower part of the section 11 of the absorber where it absorbs additional refrigerant vapors and collects at the bottom of this section. The absorbent is then pumped by means of the pump 25 through the line 26 into the next section 27 of the absorber 13 in which the pressure is greater than in the section 11. Because of this greater pressure the partially saturated absorbent which was too warm to absorb further refrigerant vapors in section 11 under the pressures existing therein absorbs additional refrigerant vapors in the section 27 and after passing through the bubble trays or other baffling 27' of this section, collects in a liquid body in the bottom thereof. From this section it is passed through the line 28 by means of the pump 32 to the water cooled cooler 29 and from there through the line 30 into section 31 of the absorber 13. A motor valve 33 in the line 28 is controlled by the liquid level controller 34 maintaining a desired liquid level in the bottom of section 27.

In section 31 of the absorber 13 the absorbent passes through the bubble trays or other baffling 31' into the bottom of this section where it collects. The pressure in section 31 is higher and the absorbent therefore absorbs additional refrigerant vapors. From this section the absorbent is passed through the line 35 by means of the pump 38 to a water cooler 36 and from there by line 37 into the lowermost section 41 of the absorber 13. As before, a motor valve 39 is included in the line 35 and is controlled by the liquid level controller 40 to maintain a desired liquid level in the lower part of section 31.

At this point it may be noted that for certain absorbents and refrigerants the requirement for more efficient operating conditions may justify cooling the absorbent as it passes through the line 26, by means of coolers which may be similar to the heat exchangers 5 and 20. Likewise, as in the case of tray 18, the other sections may be provided with intermediate take-off trays and cooling means similar to the arrangement comprising the parts 19, 20, 21, 22, 23 and 24, or by means of a cold water cooler like that indicated at 29.

The pressure in the absorber section 31 is higher than that in the section 27 and likewise the pressure in section 41 is higher than in the section 31.

The absorbent discharged into section 41 passes through the bubble tray 41' or equivalent contact means and collects in the bottom of that section. As the pressure in the sections 27, 31 and 41 is increasingly higher the absorbent under the same temperature conditions can progressively absorb more refrigerant vapors.

The saturated absorbent which accumulates in the bottom of section 41 is then passed by means of the pump 42 through the line 43 to distilling equipment, not shown, where the refrigerant is distilled, condensed and returned to flash tank 2 through the pipe 1 and the remaining absorbent with the refrigerant almost entirely removed returns to the absorption equipment through the line 9. The liquid level in the section 41 is maintained constant by means of the liquid level controller 45 controlling the motor valve 44 in the line 43.

The refrigerant vapors from flash tank 2 pass through line 15 into the highest pressure absorber section 41 and are almost completely absorbed therein. Any impurities in vapors not so absorbed pass through the pipe 46 into the bottom of the next lower pressure absorber section 31. The maximum pressure in absorber section 41 is determined through back pressure regulator valve 47 included in the line 46.

The space in the heat exchanger 20 around its tubes is supplied with liquid refrigerant from the flash tank 48 through the line 55 and the refrigerant vapors from that space are returned to the top of the flash tank 48 through the line 56. The refrigerant vapors from flash tank 48 pass through line 49 into absorber section 31 and are therein almost completely absorbed. Any impurities and unabsorbed vapors pass from the top of section 31 into the next lower pressure absorber 27 through pipe 50 in which is the back pressure regulator valve 51.

Some of the cold liquid refrigerant from flash tank 2 passes through the line 52 into the flash tank 48 and the liquid level therein is maintained by means of the motor valve 53 in the line 52 controlled by the liquid level controller 54. Thus sufficient liquid refrigerant flows from flash tank 2 to flash tank 48 to maintain a liquid level therein sufficient to keep the cooling device of cooler 20 submerged in liquid refrigerant delivered thereto through the pipe 55.

Cold liquid refrigerant, in this case anhydrous ammonia, flows from the flash tank 48 through the line 57 into flash tank 58, in which a constant liquid level is maintained by the operation of motor valve 59 under the control of the liquid level controller 60. The reduction of pressure on the refrigerant as it passes through the valve 59 causes evaporation of the refrigerant to continue until the refrigerant is cooled to its boiling temperature under the existing pressure. The refrigerant vapors formed in the flash tank 58 pass into absorber section 27 through the line 61 and are almost completely absorbed therein. Any impurities and unabsorbed vapors pass through pipe 62 into the next lower pressure absorber section 11. The back pressure regulator 63 is included in this line.

The cold refrigerant close to its full coldest temperature passes from the flash tank 58 through the pipe 64 into the heat exchanger 65 where this low temperature refrigerant is employed to cool the material or substance for which the system is provided. The cold refrigerant submerges the tubes in the heat exchanger 65 and the material to be refrigerated is delivered to the interior of the tube through the line 68 and removed at the desired temperature through the line 69. The tubes in heat exchanger 65 are held submerged in liquid refrigerant by means of the motor valve 66, the flow in the line 64 being regulated by valve 66 which is controlled by the liquid level controller 67.

The refrigerant vapors formed by the absorption of heat from the material to be refrigerated are delivered by the line 70 into the lowest pressure and therefore the coldest absorber section 11. Any vapors not absorbed in the series of absorbers accumulate in the top of the absorber section 11 and are discharged through pipe 71 into the air or to some place for further processing. If the pressure in section 11 is sub-atmospheric a suitable compressor or vacuum pump 72 is placed in the line 71 to maintain the desired pressure in section 11. With such a system it is possible to cool the refrigerant to a temperature of from minus 50 to minus 100 degrees F.

If the material to be refrigerated is to be cooled through a considerable range of temperature it may be cooled by means of a series of progressively cooler heat exchangers each supplied with liquid refrigerant from the most suitable of the flash tanks 2, 48 and 58, or from other flash tanks suitably connected in the circuits. The vapors from each cooler pass to that section of the absorber 13 in which the pressure corresponds to the evaporating temperature in the heat exchanger.

For some refrigerants and absorbents it may be desirable to place a compressor in the pipe 70 so as to either decrease the pressure in the refrigerator 65 or increase the pressure in absorber section 11.

A typical application for a system of this type would be its use to condense ethane in refrigerator 65 under about 70 pounds per square inch. The ethane could then be evaporated at atmospheric pressure to furnish refrigeration to condense methane at about 500 pounds per square inch to produce the final cooling medium for a denitrogenation plant.

There is disclosed in Figure 2 an application of the principles of this invention wherein natural gasoline is separated from natural gas by refrigeration. Such a system is much more suitable for this purpose than a propane compression, refrigeration and purification cycle, as sometimes used for the purpose. The fire and explosion hazard presented by the use of propane is eliminated by the ammonia absorption system and leaks are more easily located, thereby reducing losses to a minimum. As compared with the propane compression refrigeration system, the ammonia absorption refrigeration system contains very little moving equipment, and such as is employed is relatively inexpensive and is simple to repair and maintain. The advantage of a multi-stage ammonia evaporation refrigeration system is that cooling may be effected in stages where the ammonia evaporated for highest cooling can be absorbed in the same aqua ammonia used for absorbing the ammonia evaporated for lower temperature cooling.

Prior multi-stage ammonia evaporation refrigeration systems have been devised. In these systems the liquid anhydrous ammonia from the condenser was supplied to each of four evaporators and therefore liquid ammonia was flashed from its initial temperature and pressure to the desired temperature and pressure in each evaporator. This is to be contrasted with the instant system in which the liquid ammonia is flashed from the initial temperature and pressure to a pressure substantially equal to that of the highest pressure absorption stage; the residual liquid ammonia which has been cooled by this flashing operation is then flashed in a second stage to a pressure substantially equal to that of the next lower pressure absorption stage, etc. This process results in the aqua ammonia in each absorption stage being saturated at the pressure in that stage with the result that less aqua ammonia has to be circulated for a given refrigeration load.

Referring to Figure 2, liquid ammonia from a receiver 75 at 90 degrees is expended into a flash tank 78 to a pressure of 30 pounds per square inch absolute. It is delivered to the flash tank through the line 76 containing a motor valve 77 controlled by the liquid level controller on the flash tank 102. This reduction in pressure results in the evaporation of approximately 20% of the ammonia causing a cooling of the remaining refrigerant liquid to a temperature of 0° F. The vapors pass from the flash tank 78 through the line 79 into section 80 of the absorber 500, which section is maintained at a pressure of 30 pounds per square inch absolute. The liquid ammonia at 0° F. passes by line 81 into the first stage 82 of the natural gas cooler. A motor valve 83 is included in line 81 and is controlled by the liquid level controller 84. The various heat exchangers of the gas coolers are like those previously described, that is the heat exchanger 5, for example, and the liquid refrigerant at 0° F. passes around the tubes from one heat exchanger to the next in series in the stage 82, as indicated in the drawings. The natural gas is delivered through the line 85 into the branch pipes which connect the various heat exchangers of each stage in series, as indicated in the drawing, so that the final cooled gas ultimately reaches the line 140 after passing through the tubes of the heat exchangers of the three stages 82, 92 and 170 of the gas cooler.

In the first stage 82, the refrigerant is cooled to about minus 20° F., part of the liquid refrigerant evaporating in the heat exchangers of the first stage to thus reduce the temperature of the remainder. The natural gas which is delivered at 2° F. to the first stage is cooled to about minus 10° F.

From the first stage 82 of the gas cooler the remaining vapors and liquid ammonia pass into a separator 87 through the line 86, where the vapors and liquids are separated. The vapors from the separator 87 pass through the line 88 into the section 89 of the absorber which is maintained at about 18 pounds per square inch absolute, and the liquid refrigerant from the separator 87 passes through the line 89' into the second stage 92 of the gas cooler. A motor valve 90 is included in the line 89' and is controlled by the liquid level controller 91 on the separator 87. In the second stage coolers part of the liquid refrigerant evaporates to cool the liquid to about minus 30° F. and supplying the refrigeration needed to cool the gas stream from minus 10° F. to about minus 20° F. as they pass through the second stage coolers.

From the second stage coolers the vapors and liquids pass through the line 93 into a second separator 94. The vapors from this separator at about minus 30° F. pass through the line 95 into the section 97 of the absorber which is maintained at a pressure of about 14 pounds per square inch absolute. The liquid refrigerant at about minus 30° F. which collects in 94 is delivered by the line 98 into the third stage of coolers 170. A motor valve 99 is included in the line 98 and is controlled by the liquid level controller 100 on the separator 94.

In the coolers 170 part of the liquid refrigerant evaporates to cool the remainder to about minus 45° F. effecting a cooling of the gas from minus 20° F. to about minus 30° F. From the final stage of coolers the vapors of any remaining liquid ammonia pass into a third vapor separator 102 through the line 101 and by-pass lines 160 and 161. From this separator the vapors pass through the line 103 into the remaining section 105 of the absorber 500, wherein a pressure of about 9 pounds per square inch is maintained. A liquid level controller 162 on the separator 102 controls the motor valve 77 in the line 76 so that the tubes in the gas coolers are kept immersed in liquid ammonia.

The various sections of the absorber 500 contain bubble trays as in the arrangement of Figure 1 to effect efficient contact of the ammonia vapors with the aqua ammonia to insure maximum absorption thereof. Take-off trays are provided so that the aqua ammonia can be cooled as needed by pumping it through water cooled coolers to remove the heat of absorption as in the case of the arrangement of Figure 1. The last intermediate take-off trays in section 105 are provided with liquid removal lines which contain the water coolers 106 and 107 and the pumps as shown. The liquid which collects in the bottom of the section 105 is conducted to the top of section 97 by means of the pump 113. The line including the cooler 108 and the pump removes the liquid from the take-off tray in section 97 and delivers it into that section below the tray. The liquid which collects in the bottom of section 97 passes through the water cooler 109 and is pumped into the top of section 89. This section has several take-off trays and the liquid is transferred from above them to below them by means of lines containing the coolers 110 and 111 and pumps, as shown. The liquid which collects in the bottom of section 89 is pumped to the top of section 80 by means of the pump 114. Section 80 has a take-off tray from which the liquid passes through the water cooler 112 and a pump to the compartment below this tray.

The separated or strong aqua ammonia is pumped from the bottom of section 80 through the line 117 to and through the heat exchangers 118 and by means of line 120 into the bubble tray evaporator 119. The weak aqua ammonia, practically pure water, at boiling temperature, passes from the bottom of evaporator 119 by gravity through the line 121 to the boiler 122. The steam from this boiler enters the evaporator 119 below the trays thereof through the line 123. This steam supplies the heat required to distill the ammonia from the aqua ammonia. Practically all of the steam is condensed in the evaporator but about 5% remains in the ammonia vapors passing to the analyzer 124. The weak aqua ammonia which collects in the bottom of evaporator 119 passes in part to the heat exchangers 118 where the relatively colder saturated aqua ammonia passing through these heat exchangers from line 117 chills the weak aqua ammonia on its way to the top of absorber section 105 through the line 115. Further cooling, if desired is effected in the water cooled cooler 116. A motor valve 150 in this line is controlled by the liquid level controller 151 so that the desired pressure is maintained in section 105.

In the analyzer 124 the vapors are cooled from about 250° F. to about 110° F. under which condition the quality of the ammonia vapor is increased to about 99.4% and the condensed steam and ammonia solution is returned to the top tray of the evaporator. In order to further dehydrate the ammonia vapors they are passed upward through a fractionator comprising the section 119' of the evaporator containing a number of bubble trays. Sufficient liquid ammonia is introduced from the ammonia receiver 75 by means of a pump in the line 127 to the top tray of the fractionator so that practically all of it is evaporated in cooling the ammonia vapors down to condensing temperatures. By this arrangement the quality of the anhydrous ammonia can easily be held above 99.9%. The ammonia vapors from the top of the fractionator are delivered through the line 131 to the water cooled cooler 132 where they are condensed and returned to the receiver 75, at a temperature of about 90° F.

The top of the absorber 500 is provided with a line 128 and a pump for purging the absorber and aiding in maintaining the desired pressure in section 105 thereof.

The top of the receiver 75 is provided with a bleed line 129 containing the back pressure valve 130 to maintain the necessary pressure in the receiver 75. Line 129 may be connected to the bottom of the absorber so that any ammonia in the vapors is recovered.

The natural gas and gasoline at about minus 35° F. are delivered to the separator 141 through the line 140. The natural gasoline is taken off through the line 142 and the uncondensed gas is withdrawn through the line 143.

From the above description it will be apparent to those skilled in the art that the subject matter of this invention is capable of some variation in deails, some of which have been indicated, and I do not, therefore, desire to be limited to the disclosure but only the claims granted me.

What is claimed is:

1. A method of refrigeration which comprises, subjecting a stream of liquefied ammonia in several successive stages to a pressure drop to flash a portion thereof at each stage into gaseous ammonia to cool the liquid ammonia remaining at each stage and progressively absorbing the ammonia vapors thus generated with a stream of aqua ammonia in stages of increasing concentration and pressure, whereby the liquid ammonia remaining in the final stage is cooled to a desired temperature and removing the heat of absorption from the aqua ammonia stream prior to each absorption step.

2. A method of refrigeration which comprises successively subjecting a stream of liquefied ammonia to conditions of succeedingly lower pressure to flash a portion thereof at each pressure stage into gaseous ammonia, progressively countercurrently absorbing the ammonia vapors thus generated with a stream of aqua ammonia whereby the same stream of aqua ammonia absorbs the ammonia vapors generated in said successive stages under conditions of increasing pressure, and removing the heat of absorption from the aqua ammonia stream prior to each absorption step by heat exchange at at least some of said stages with the cooled ammonia at these stages.

3. In a refrigeration system of the type described, comprising a plurality of absorption chambers, means for delivering the absorbent successively from one chamber to the next, means for maintaining a different pressure in each of the said chambers, means for supplying the absorbent to the chamber of lowest pressure, means for successively reducing the pressure on a stream of liquefied ammonia to convert a portion thereof into ammonia vapors and cool the remaining portion of liquid ammonia, means for delivering the ammonia vapor generated at the first stage to the chamber of highest pressure, means for delivering the ammonia vapor generated at each of the succeeding stages to said remaining stages respectively to concentrate the absorbent, and means for removing the heat of absorption from the absorbent during transference from at least one chamber to the succeeding chamber.

4. In a refrigeration system of the type described, comprising a plurality of absorption chambers, means for delivering the absorbent successively from one chamber to the next, means for maintaining a different pressure in each of the said chambers, means for supplying the absorbent to the chamber of lowest pressure, means for successively reducing the pressure on a stream of liquefied ammonia to convert a portion thereof into ammonia vapors and cool the remaining portion of liquid ammonia, means for delivering the ammonia vapor generated at the first stage to the chamber of highest pressure, and means for delivering the ammonia vapor generated at each of the succeeding stages to said remaining stages respectively to concentrate the absorbent, and means for removing the heat of absorption during transference from at least one chamber to the succeeding chamber by heat exchange with the ammonia cooled at one of said stages.

5. In a refrigeration system, the combination comprising a source of liquefied anhydrous ammonia, means for progressively reducing the pressure on the body of said liquefied ammonia in successive stages, and means for progressively absorbing gaseous ammonia formed at each pressure reduction with aqua ammonia in successive stages of increasing pressure, the aqua ammonia increasing in concentration at each of said stages, means for maintaining the aqua ammonia at each succeeding absorption stage under a predetermined pressure, and means for cooling the aqua ammonia after each absorption step and prior to its introduction to the next step.

6. In a refrigeration system of the type described, the combination comprising a source of weak aqua ammonia absorbent, a source of liquid anhydrous ammonia, means for successively expanding the body of the said liquid ammonia in indirect heat exchange with said aqua ammonia absorbent in several stages to cool both the aqua ammonia and the liquid ammonia, said absorbent being that which is to be used in the succeeding stage of absorption, a plurality of absorption chambers maintained at progressively increasing pressures, means for contacting the vaporized ammonia and the aqua ammonia in said chambers to increase the concentration of the aqua ammonia in each of said stages, and means for maintaining pressures in said chambers substantially equal to the ammonia vapor pressures at said respective stages.

7. In a refrigeration system of the type described, the combination comprising a source of aqua ammonia, a source of liquid anhydrous ammonia to form a body thereof, means for successively flashing vapor from the body of liquid ammonia retained in indirect heat exchange relation with said aqua ammonia in several stages through reduction in pressure on the body of liquid anhydrous ammonia in each successive stage, thereby cooling both the aqua ammonia and the liquid ammonia, a plurality of absorption chambers maintained at successively higher pressures and means for conducting the ammonia vapors resulting from evaporation of said anhydrous ammonia together with the aqua ammonia through said absorption chambers to absorb the ammonia vapors successively under pressures substantially equal to the respective pressures under which they are evaporated.

FORREST E. GILMORE.

References Cited in the file of this patent

UNITED STATES PATENTS

| Number | Name | Date |
|---|---|---|
| 967,992 | Starr | Aug. 23, 1910 |
| 2,182,453 | Sellew | Dec. 5, 1939 |
| 2,326,900 | Thomas | Aug. 17, 1943 |

FOREIGN PATENTS

| Number | Country | Date |
|---|---|---|
| 579,992 | Germany | July 4, 1933 |